(12) United States Patent  (10) Patent No.: US 6,501,417 B1
Bowlds                    (45) Date of Patent:   Dec. 31, 2002

(54) TRANSCEIVER ASSEMBLY USED IN A DOPPLER-BASED TRAFFIC RADAR SYSTEM

(75) Inventor: Daniel P. Bowlds, Hawesville, KY (US)

(73) Assignee: MPH Industries, Inc., Owensboro, KY (US)

( * ) Notice: Subject to any disclaimer, the term of this patent is extended or adjusted under 35 U.S.C. 154(b) by 0 days.

(21) Appl. No.: 10/008,252

(22) Filed: Nov. 13, 2001

(51) Int. Cl.$^7$ .............................................. G01S 13/58
(52) U.S. Cl. ...................... 342/104; 342/114; 342/115; 342/116; 342/192
(58) Field of Search ......................... 342/25, 104–105, 342/114–116, 189, 192, 194–197

(56) References Cited

U.S. PATENT DOCUMENTS

| | | |
|---|---|---|
| 3,438,031 A | 4/1969 | Fathauer |
| 3,689,921 A | 9/1972 | Berry |
| 3,750,172 A | 7/1973 | Tresselt |
| 3,870,990 A | 3/1975 | Fathauer |
| 3,898,655 A | 8/1975 | Tresselt |
| 3,899,772 A | 8/1975 | Mead et al. |
| 3,936,824 A | 2/1976 | Aker et al. |
| 4,020,490 A | 4/1977 | Millard |
| RE29,401 E | 9/1977 | Aker et al. |
| 4,052,722 A | 10/1977 | Millard |
| 4,070,634 A | 1/1978 | Barker et al. |
| 4,148,028 A | 4/1979 | Fujiki |
| 4,184,156 A * | 1/1980 | Petrovsky et al. ........... 342/104 |
| 4,214,243 A | 7/1980 | Patterson |
| 4,219,878 A | 8/1980 | Goodson et al. |
| 4,236,140 A | 11/1980 | Aker et al. |
| 4,293,859 A * | 10/1981 | Sergent ....................... 342/104 |
| 4,335,382 A | 6/1982 | Brown et al. |
| 4,335,383 A | 6/1982 | Berry |
| 4,740,048 A | 4/1988 | Goodson et al. |
| 4,743,908 A | 5/1988 | Brassfield et al. |
| 4,788,553 A * | 11/1988 | Phillips ....................... 343/753 |
| 4,818,999 A | 4/1989 | Kobayashi et al. |
| 4,935,742 A | 6/1990 | Marin |
| 5,150,128 A | 9/1992 | Kongelbeck |
| 5,159,345 A | 10/1992 | Young |
| 5,181,038 A | 1/1993 | Asbury et al. |
| 5,285,207 A | 2/1994 | Asbury et al. |
| 5,400,034 A | 3/1995 | Smith |
| 5,402,129 A | 3/1995 | Gellner et al. |
| 5,504,488 A | 4/1996 | Henderson et al. |
| 5,510,795 A | 4/1996 | Koelle |
| 5,525,996 A | 6/1996 | Aker et al. |
| 5,528,245 A | 6/1996 | Aker et al. |
| 5,528,246 A | 6/1996 | Henderson et al. |
| 5,557,281 A | 9/1996 | O'Conner |
| 5,563,603 A | 10/1996 | Aker et al. |
| 5,565,871 A | 10/1996 | Aker et al. |
| 5,570,093 A | 10/1996 | Aker et al. |
| 5,691,724 A | 11/1997 | Aker et al. |
| 5,777,575 A | 7/1998 | Shelton et al. |
| 5,917,430 A | 6/1999 | Greneker, III et al. |
| 6,008,750 A * | 12/1999 | Cottle et al. .................. 342/42 |
| 6,023,236 A | 2/2000 | Shelton |
| 6,198,427 B1 * | 3/2001 | Aker et al. ................. 342/104 |

* cited by examiner

Primary Examiner—Thomas H. Tarcza
Assistant Examiner—Isam Alsomiri
(74) Attorney, Agent, or Firm—King & Schickli, PLLC

(57) ABSTRACT

A transceiver assembly is provided for use in a Doppler-based traffic radar system for determining the speed of at least one target. The transceiver assembly includes a cover for receiving therein at least some of the component parts of the transceiver assembly. In other words, the cover is positioned over the component parts of the transceiver assembly which are enclosed by a cap removably attached to the cover. A conical antenna horn and turnstile waveguide cavities are formed from a unitary material. The circuitry associated with the transceiver assembly is modularized such that the circuitry may be removed from the transceiver assembly, or more specifically separated from the microwave components of the transceiver assembly, for testing.

21 Claims, 5 Drawing Sheets

TRANSCEIVER ASSEMBLY USED IN A DOPPLER-BASED TRAFFIC RADAR SYSTEM

TECHNICAL FIELD

The present invention relates generally to a transceiver assembly for use in a Doppler-based traffic radar system and, more particularly to a low visibility transceiver assembly having a reduced overall size or footprint.

BACKGROUND OF THE INVENTION

Law enforcement officers have utilized Doppler-based traffic radar systems to monitor vehicle speeds and enforce traffic speed limit laws for many years. Throughout this period of time, numerous improvements in both the underlying technology and in the specific application of new processing techniques for the traffic radar systems themselves have afforded law enforcement officers greater flexibility and improved reliability in carrying out their duties. One such improvement evident in most traffic radar systems presently being marketed includes the capability to more accurately and reliably monitor the speed of certain vehicles while the patrol vehicle is either in a stationary or a moving mode of operation. In fact, present traffic radar systems can now accurately monitor the speed of vehicles approaching the moving patrol vehicle in an opposite lane, monitor the speeds of a group of target vehicles simultaneously and determine the fastest vehicle within the group, and even monitor the speed of a vehicle traveling in the same direction as the patrol vehicle independent of whether the vehicle is approaching or receding from the patrol vehicle, i.e., going faster or slower than the patrol vehicle. Importantly, each of these new or improved capabilities provide the law enforcement officer with a more complete picture of the traffic environment and thus, a more flexible and reliable basis for making more informed decisions.

Despite all the improvements in both the underlying technology utilized in these traffic radar systems and the radar systems themselves, only nominal attention has been given to improving the transceiver assemblies which form an important part of the overall radar system. Almost all transceiver assemblies utilized in the industry include a housing which receives microwave components (e.g., a turnstile and antenna horn) and circuitry (e.g., power supplies and pre-amplifiers) through a front or forward facing opening. Most commonly, a lens attached to the antenna horn for forming a radar wave into a beam extends through the front opening of the housing forming a seal between the lens and the housing. Other transceiver assemblies utilized in the industry include an additional cap which is placed over the portion of the lens extending from the housing. The cap is attached to the housing forming a seal between itself and either the lens or the housing. Examples of traffic radar systems which utilize these types of transceiver assemblies include the K-55, and the PYTHON, PYTHON Series II, and PYTHON Series II FS radar systems manufactured by MPH Industries, Inc., the assignee of the present invention. Other radar systems such as the EAGLE Series radar systems manufactured by Kustom Signals, Inc. and the STALKER Dual SL and STALKER DSR manufactured by Applied Concepts, Inc., among others, offer similar products.

In operation, transceiver assemblies are typically visibly mounted in a front and/or a rear windshield area of the patrol vehicle, e.g., to a dashboard or suspended from a headliner or window frame. Depending on the overall size or footprint, and placement of the transceiver assembly, the law enforcement officer's line of sight could be obstructed and/or the visibility of the transceiver assembly could provide advanced warning of the presence of the officer and more importantly, the radar system itself. As indicated above and despite these known limitations of present state of the art transceiver assemblies, very little effort has been devoted to improving the transceiver assembly by reducing its overall size or footprint and visibility, or otherwise.

Recently issued U.S. Pat. No. 6,008,750 to Cottle et al., assigned to Decatur Electronics, Inc., addresses the limitations created by the overall size of transceiver assemblies in the industry and describes a transceiver assembly having a reduced footprint. The transceiver assembly in the Cottle et al. patent utilizes an off-the-shelf patch antenna which is positioned within a square housing having a forward facing opening covered by a square cap. The off-the-shelf patch antenna was selected for its reduced size, and more specifically its minimal depth, compared to the industry standard conical horn antennas which are typically on the order of three inches in length causing the overall size or footprint of a transceiver assembly to be quite large. The Cottle et al. patent further suggests that a reduction of this standard length horn antenna below one and three quarter inches is not practical due to the physical and operational limitations of conical horn antennas and turnstiles used therewith.

Accordingly, a need is clearly identified for a radar system and more specifically, a transceiver assembly utilizing a conical horn antenna having a reduced overall size or footprint which provides increased flexibility in its placement within the patrol vehicle thereby limiting obstructions to the law enforcement officer's line of sight, and reduced visibility from outside of the patrol vehicle. Preferably, the radar system and transceiver assembly would significantly reduce, if not eliminate, the above limitations of present transceiver assemblies in an aesthetically appealing assembly.

SUMMARY OF THE INVENTION

A novel and improved transceiver assembly is provided for use in a Doppler-based traffic radar system for determining the speed of at least one target. The transceiver assembly includes a cover for receiving therein component parts of the assembly including at least one of an oscillator, a turnstile, a conical antenna horn and a lens, a mixer, and circuitry. In other words, the cover is positioned over at least some of the component parts of the transceiver assembly which are enclosed by a cap removably attached to the cover.

In accordance with an important aspect of the present invention, the cover is specifically designed to allow a radar wave to pass there through substantially unaffected. In other words, at least a portion of the cover is transparent electrically, i.e., only nominal losses due to attenuation are incurred as a result of passing through the cover. In order to minimize these losses, the material selected for the cover, and the thickness and shape of at least a portion of the cover through which the transmitted waves travel may be specifically selected. Advantageously, this allows the overall shape of the cover to be selected for purely aesthetic reasons, if desired. In addition to selecting a material, and thickness and shape of at least a portion of the cover, the color of the cover may be further selected to reduce the visibility of the cover, and necessarily the transceiver assembly when mounted in a patrol vehicle.

In accordance with another important aspect of the present invention, the transceiver assembly has an overall size or footprint which is smaller than previously thought possible in the industry. Advantageously, this smaller overall footprint provides several advantages including flexible placement of the transceiver assembly within the patrol vehicle in locations which heretofore may have been considered too small to accommodate the transceiver assembly (e.g., behind the rear-view mirror) thereby limiting obstructions to the law enforcement officer's line of sight, and reduced visibility from outside of the patrol vehicle.

The ability to reduce the overall footprint of the transceiver assembly is attributable in the present invention to the selection and design of the component parts of the assembly. For example, the conical antenna horn and turnstile may be formed from a unitary material. In addition to limiting the size of the assembly, forming the antenna horn and turnstile from a unitary material also lowers the number of component parts requiring assembly and thus, manufacturing expenses. Further, the length of the conical antenna horn which is a significant component of the overall size of the assembly, may be limited in some embodiments to no more than one and three-quarter inches in length. Of course, variations of the length of the antenna horn and taper angle are possible in accordance with the broad teachings of the present invention.

In addition to reducing the overall size or footprint of the transceiver assembly in order to provide the above-noted advantages, the circuitry associated with the transceiver assembly may be modularized such that the circuitry may be tested apart from the transceiver assembly. More specifically, the circuitry may be separated from the microwave components of the transceiver assembly for testing. In this manner, the circuitry may be independently tested prior to assembly within the transceiver assembly or during troubleshooting if a failure were to occur.

In accordance with the broadest teachings of the present invention, the transceiver assembly may be used in a Doppler-based traffic radar system. These radar systems are well known in the industry and generally include a processing unit coupled to one or more transceiver assemblies for determining and displaying a speed of at least one target. As indicated above, examples of these traffic radar systems include the PYTHON Series, SPEEDGUN PLUS, and DS 3 radar systems manufactured by MPH Industries, Inc., the assignee of the present invention. The details of at least some of these radar systems are set out in U.S. Pat. No. 6,008,752, for example, and incorporated herein by reference. Other radar systems mentioned above such as the EAGLE Series systems manufactured by Kustom Signals, Inc. or the STALKER Series systems manufactured by Applied Concepts, Inc. are also available. The details of these radar systems are set out in U.S. Pat Nos. 5,504,488, 5,528,246, 5,570,093 and 6,198,42 which are each incorporated herein by reference.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to the present preferred embodiment of the invention, an example of which is illustrated in the accompanying drawings.

DETAILED DESCRIPTION OF THE PREFERRED EMBODIMENT

Figure 1:
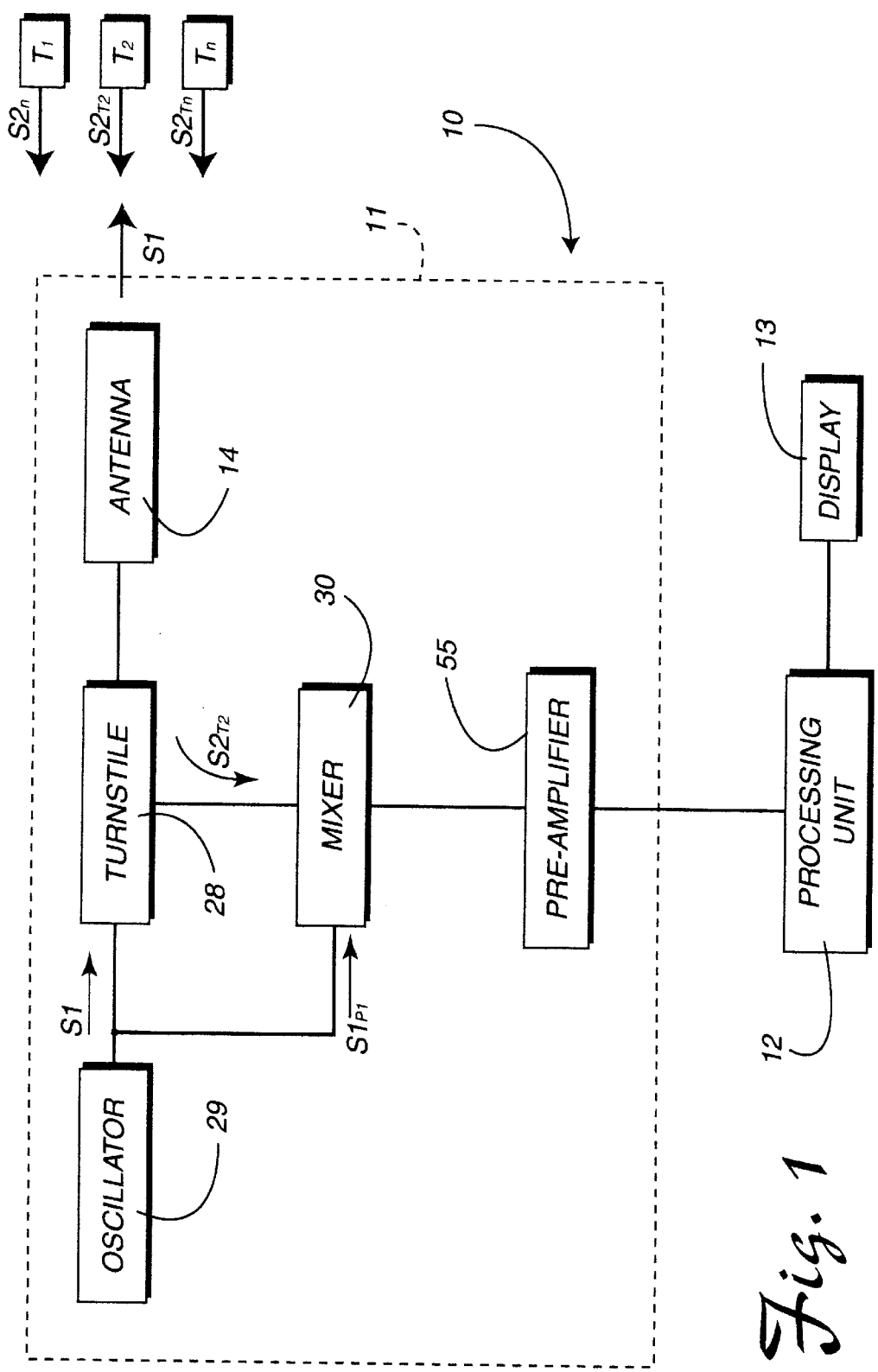
FIG. 1 is an overall schematic block diagram of a Doppler-based radar system of the present invention.

With reference now to the schematic block diagram of FIG. 1, there is shown a preferred embodiment of a Doppler-based radar system 10 including a transceiver assembly 11, a processing unit 12, and a display 13 for use in monitoring the speed of moving targets. More specifically, the radar system 10 of the present invention is adapted to determine the speed of at least one selected moving target, (e.g., $T_1$, $T_2 \ldots T_n$) and to display the speed of at least one of the selected targets.

Figure 2:
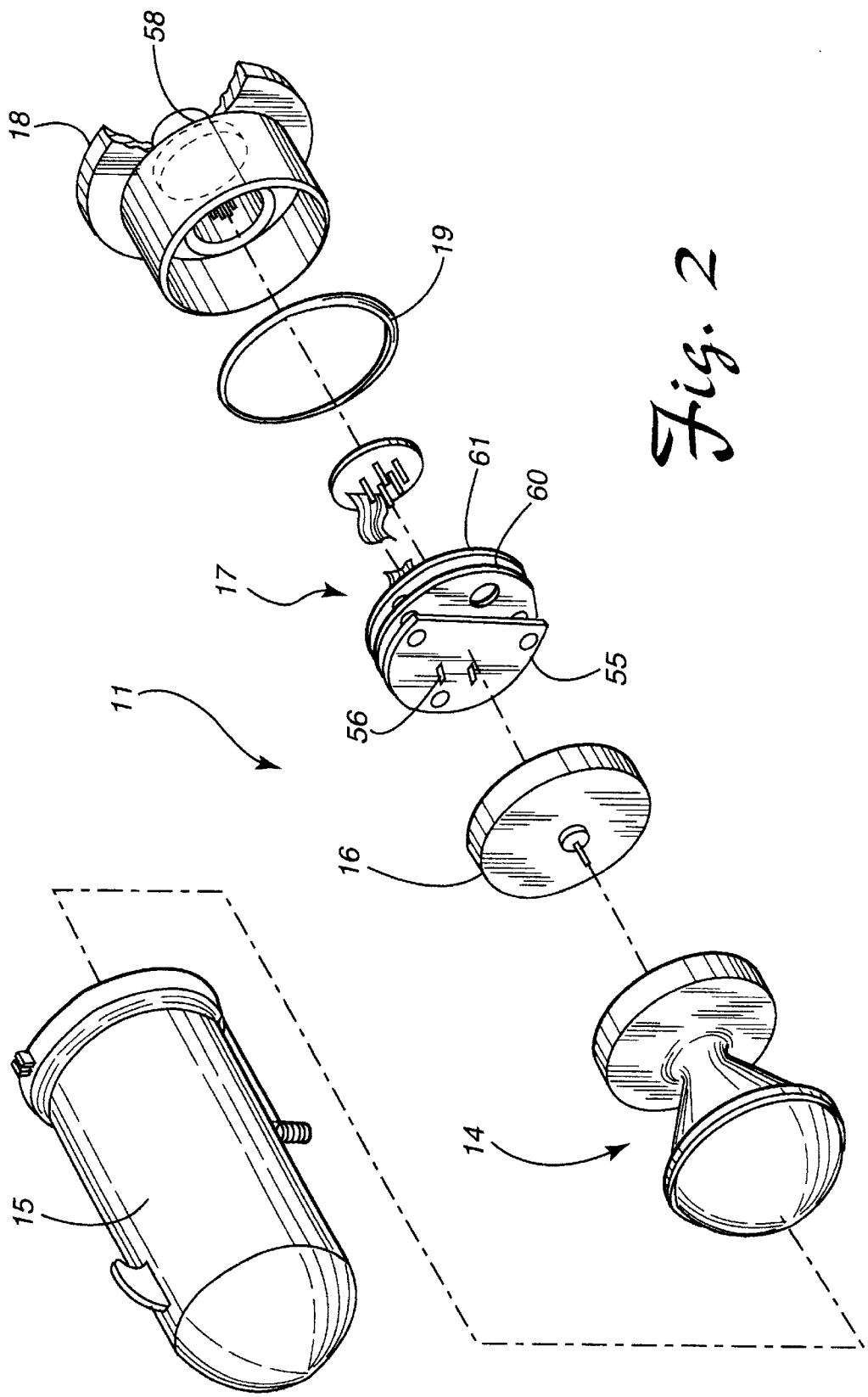
FIG. 2 is an exploded perspective view of a transceiver assembly of the present invention.

As shown in the exploded perspective view of FIG. 2, the present preferred transceiver assembly 11 includes a cover 15 for receiving therein an antenna 14, a mid-section 16 abutting the antenna, circuitry 17, and an end cap 18 which may be removably attached to a rear end of the cover. In other words, the cover 15 may be positioned over the antenna 14 and other component parts of the transceiver assembly 11 which are enclosed by the end cap 18. A seal 19 may be positioned between the cover 15 and the end cap 18 to prevent moisture, debris, and the like from entering the transceiver assembly 11.

In the present preferred embodiment, the cover 15 is made of a polycarbonate resin material specifically designed to allow a radar wave to pass there through substantially unaffected. An example of this type of material is sold by General Electric Company under the trademark LEXAN®. Of course, numerous different polycarbonate resin materials and additional different materials which are known in the art to have similar properties may be substituted for the noted preferred material in accordance with the broad teachings of the present invention. In other words, any material which is transparent electrically, i.e., only nominal losses due to attenuation are incurred as a result of passing through the material, may be used for the cover 15.

In addition, the thickness and shape of at least a portion of the cover through which the radar waves travel may be specifically tailored in order to minimize attenuation losses.

Figure 3:
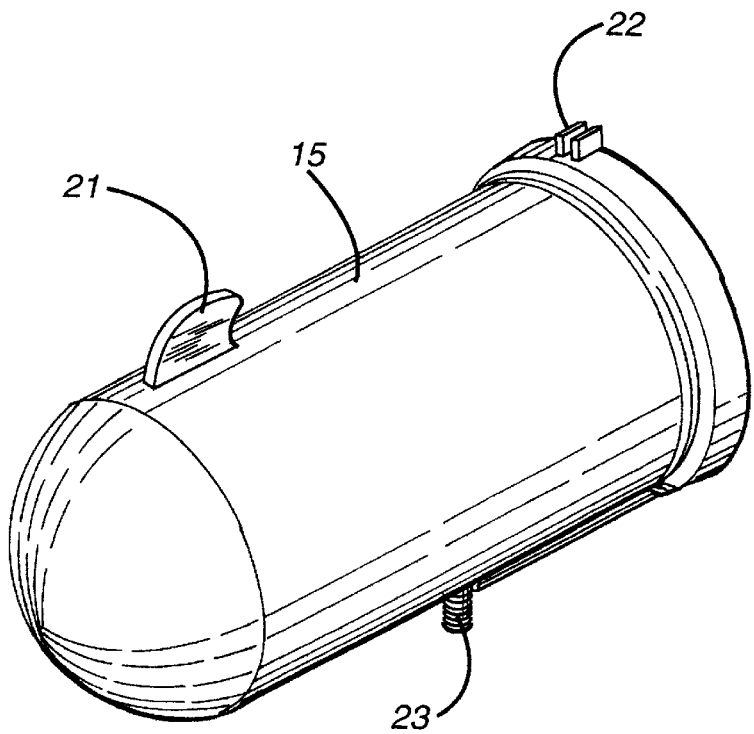
FIG. 3 is a perspective view of a cover of the transceiver assembly of the present invention.

Since the radar waves generally travel only through a front portion of the cover, the overall shape of the cover 15 can take any form. The present preferred embodiment of the cover 15, shown in FIG. 3, includes a sleek cylindrical shape selected generally for aesthetic reasons. Gun sights 21, 22 are provided on the cover 15 for utilization in quickly and accurately aligning the transceiver assembly 11 during initial set-up and operation, and a mounting post 23 extends from a lower portion of the cover 15.

Last, the cover 15 may be made from any color material which may be selected to reduce the visibility of the cover 15 and necessarily the transceiver assembly 11 from outside of the patrol vehicle. Although the cover 15 can be made from any color material, the present preferred cover is made from a material having a low visibility color, such as black. Low visibility colors may include colors which tend to absorb light, such as black and grey for example, and colors which tend to camouflage the transceiver assembly 11 with its surroundings during operation whether in or around the patrol vehicle.

Figure 4:
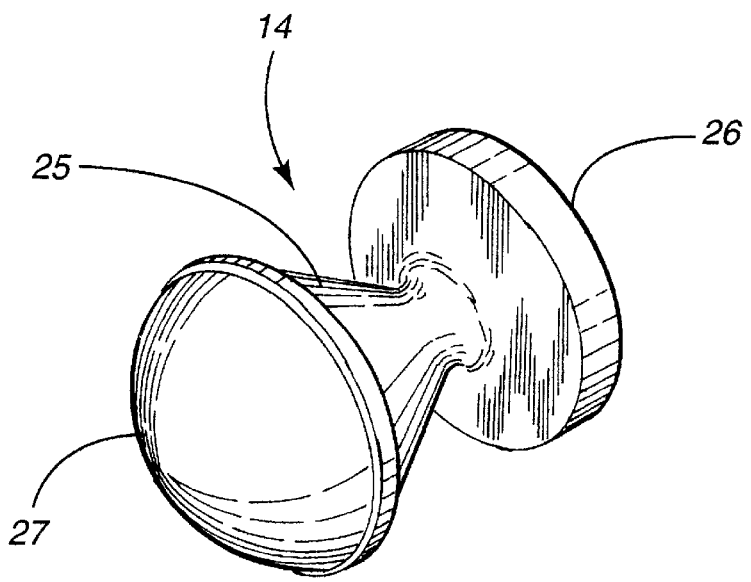
FIG. 4 is a perspective view of an antenna of the transceiver assembly of the present invention.
Figure 5:
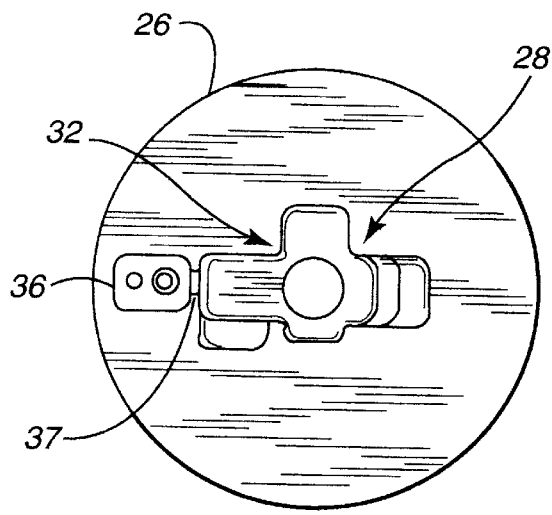
FIG. 5 is an end elevational view of an antenna showing waveguide cavities of a turnstile of the present invention.
Figure 6:
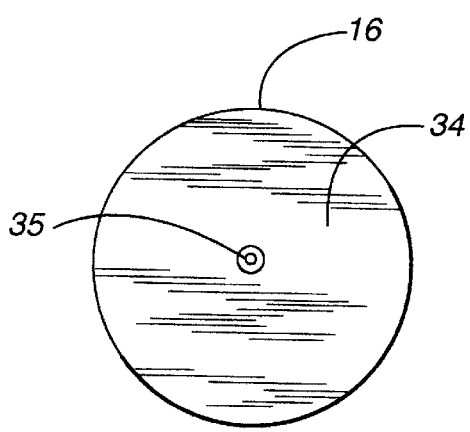
FIG. 6 is a front elevational view of a mid-section of the transceiver assembly of the present invention showing a front surface of the mid-section which forms a part of waveguides in the turnstile and a post extending therefrom for directing a radar wave toward the antenna and a reflected radar wave received from the antenna to a mixer.

As shown in FIG. 4, the present preferred antenna 14 includes a conical antenna horn 25 and a base portion 26 preferably machined from a unitary aluminum rod, and a lens 27. Of course, other manufacturing methods such as casting may also be utilized in accordance with the broad teachings of the present invention. In addition, a turnstile 28 for circularly polarizing a linearly polarized wave generated by an oscillator 29 and directing the circularly polarized wave toward the antenna horn 25, and for linearly polarizing a circularly polarized return wave and directing the linearly polarized return wave to a mixer 30 is similarly formed in the unitary aluminum rod. More specifically, waveguide cavities 32 forming a portion of the turnstile 28 may be formed in the base portion 26 of the antenna 14 as shown in FIG. 5. At least a portion of a front surface 34 of the mid-section 16 (shown in FIG. 6) forms a waveguide cavity top plate completing the waveguides. A post 35 extends from the front surface 34 into the waveguide cavities 32 and forms a portion of the turnstile 28. The post 35 directs the radar wave toward the antenna horn 25 and the reflected radar wave received from the antenna horn to the mixer 30.

The local oscillator 29 is a conventional Gunn diode oscillator and is supported by the base portion 26 of the antenna 14. In the present preferred embodiment, a resonator 36 of the local oscillator 29 is formed in the unitary aluminum rod as is an iris 37 through which the linearly polarized wave formed by the local oscillator enters the turnstile 28.

Figure 7:
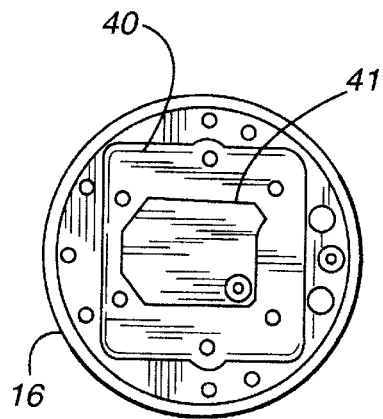
FIG. 7 is a back elevational view of the mid-section of the transceiver assembly of the present invention showing a cavity wherein a microstrip circuit board is mounted.
Figure 8:
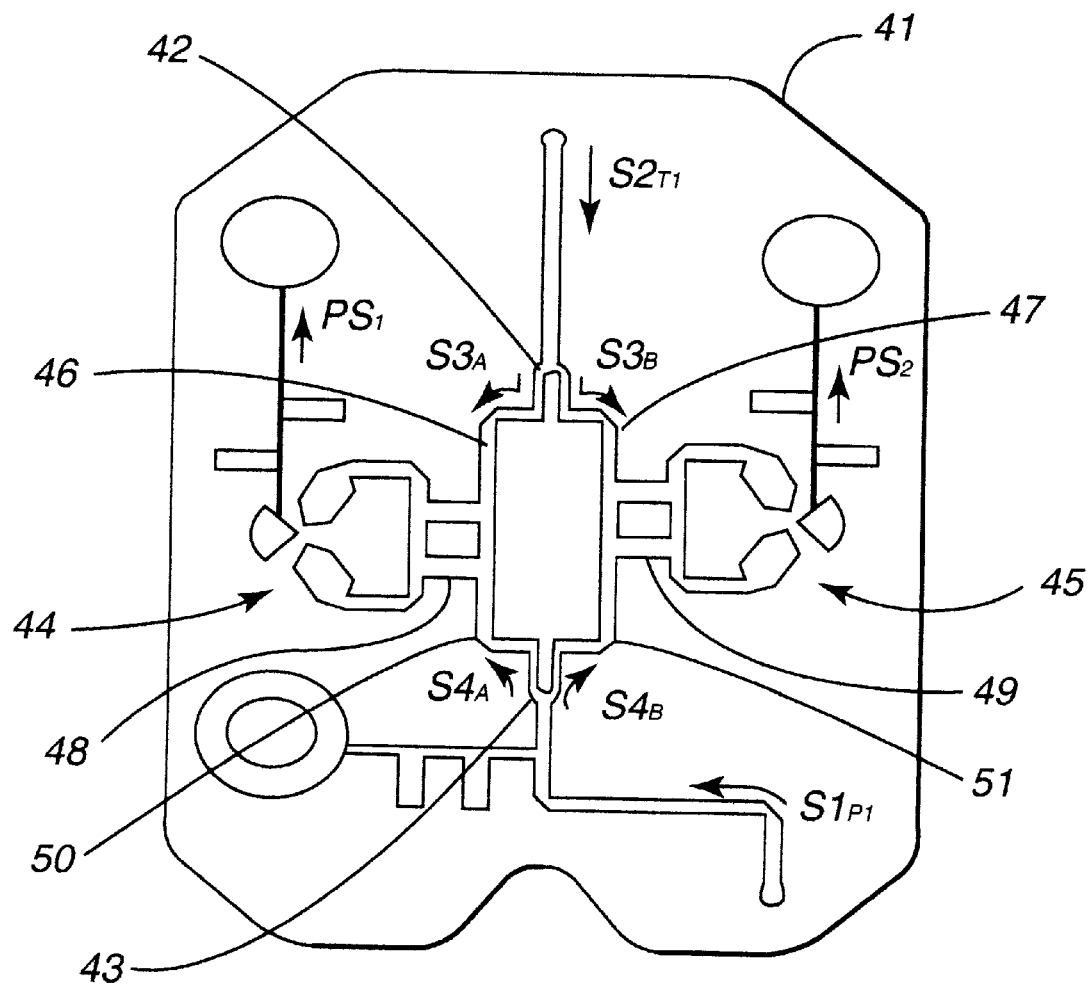
FIG. 8 is a top plan view of the microstrip circuit board of the present invention.

As shown in FIG. 7, a cavity 40 is formed in the mid-section 16 for receiving a microstrip circuit board 41 and a substantial portion of the transceiver assembly modular circuitry 17. As shown in FIG. 8, the present preferred microstrip circuit board 41 includes two Wilkinson hybrid dividers 42, 43 and two balanced mixers 44, 45. Microstrip transmission lines 46, 47 connect outputs of the first microstrip Wilkinson hybrid divider 42 which is driven by a coupled portion of the return radar waves to first receive ports of the first and second balanced mixers, and more specifically first and second microstrip branch-line quadrature hybrids 48 and 49. The return waves are substantially split by the Wilkinson hybrid divider 42 thus generating first and second return waves which are equivalent in phase and amplitude. The microstrip transmission lines 46, 47 connecting the Wilkinson hybrid divider outputs to the receive ports of the mixers are one-eighth of a wavelength different in length in order to introduce a phase shift of substantially forty-five degrees in the resulting processing signals to accommodate automatic target direction sensing in the present preferred embodiment.

Additional microstrip transmission lines 50, 51 connect outputs of the second microstrip Wilkinson hybrid divider 43 which is driven by a coupled portion of the local oscillator or transmitted radar wave to second receive ports of the balanced mixers, i.e., the microstrip branch-line quadrature hybrids 48, 49 in the present preferred embodiment. Again, the microstrip transmission lines 50, 51 connecting the second Wilkinson hybrid divider outputs to the receive ports are one eighth of a wavelength different in length in order to introduce a phase shift of substantially forty-five degrees in the processing signals.

The resulting processing signals PS1 and PS2 are transferred from the microstrip circuit board 41 to a preamplifier 55 by a pair of spring-loaded contacts 56 (shown in FIG. 2) which contact the microstrip circuit board when installed in the transceiver assembly 11. The circuitry forming the preferred preamplifier 55 is mounted to a generally circular-shaped circuit board which forms a portion of the modular circuitry 17 best shown in FIG. 2. The amplified processing signals PS1 and PS2 are forwarded to the processing unit 12, preferably via a cable 57 which terminates in a bayonet-type connector 58 mounted to the end cap 18 of the transceiver assembly 11. The preferred modular circuitry 17 further includes two power supply boards 60, 61 which provide power from the patrol vehicle to the Gunn oscillator 29, and any additional voltages (e.g., TTL voltages) required by the circuit components, respectively.

In operation, a linearly polarized wave is generated by the Gunn diode oscillator 29. The linearly polarized wave is circularly polarized in the turnstile 28 and directed to the antenna 14. In the preferred embodiment, the antenna 14 includes a conical horn antenna 25 and a lens 27 which provides a half-power beam width of thirteen (13) degrees in azimuth and elevation. The antenna 14 forms a transmitter to transmit the circularly polarized wave or radar wave S1 toward at least one target $T_1$, $T_2$ . . . $T_n$ and a receiver to receive the reflective radar waves $S2_{T1}$, $S2_{T2}$ . . . $S2_{Tn}$, respectively. The reflected radar wave $S2_{T1}$ is indicative, for example, of the speed of target $T_1$, In accordance with well known Doppler principles, if the target $T_1$, for example, is moving toward or away from the antenna, the frequency (fr) of the transmitted signal S1 is shifted (fr±d) upon contacting the target $T_1$, thus forming the reflected radar signal $S2_{T1}$ in accordance with the speed of the target.

As shown in FIG. 1, the reflected radar waves $S2_{T1}$, $S2_{T2}$ . . . $S2_{Tn}$ are received by the antenna 14 and forwarded to the turnstile 28. The turnstile 28 isolates each reflected radar wave, for example $S2_{T1}$, from the transmitted radar wave S1, converting the circularly polarized waves back to linearly polarized waves. In the present preferred embodiment, a first Wilkinson divider 42 substantially splits a coupled portion of the reflected radar wave $S2_{T1}$, thus generating first and second split waves $S3_A$, $S3_B$ which are equivalent in phase and amplitude.

As indicated above, the first split wave $S3_A$ is forwarded to a first receive port of a mixer 44 where the wave is combined with a first split coupled portion $S4_A$ of the radar wave S1 or leakage signal forwarded to a second receive port of the mixer 44. The mixer 44 combines the waves to form a test processing signal $PS_1$. Likewise, the second split wave $S3_B$ is forwarded to a first receive port of mixer 45 where the signal $S3_B$ is combined with a second split coupled portion $S4_B$ of the transmitted wave S1 forwarded to a second receive port of mixer 45. The mixer 45 combines the waves to form a reference processing signal $PS_2$.

In the present preferred invention, the resultant processing signals $PS_1$, $PS_2$ are equal in magnitude but substantially ninety degrees different in phase due to the varied length of the microstrip circuit lines 46, 47 and 50, 51 described above. The difference in phase allows the radar system 10, and specifically the processing unit 12, to determine the direction of a selected target $T_1$ relative to the patrol vehicle and to accurately calculate the resulting speed without input by the law enforcement officer. The details of the methods of processing the signals and determining the speed of the at least one target are well known in the art and need not be discussed in detail for the purpose of describing the present invention. Full descriptions of radar systems utilizing the automatic target direction sensing methods for determining the speeds of targets include the U.S. Pat. No. 6,008,752 and pending U.S. Application Ser. No. 09/845,706, both owned by the Assignee of the present invention, and U.S. Patent No. 6,198,427 owned by Applied Concepts, Inc. Each of these patents and patent application are incorporated herein by reference.

The present preferred embodiment wherein automatic target direction sensing methods are used to describe the present invention is only one type of radar system wherein the present invention may be utilized. Other radar systems which simply determine the speed of a strongest or fastest target may similarly be utilized in accordance with the broad teachings of the present invention. These different radar systems are all well known in the art and need not be described in detail herein.

In summary, a transceiver assembly 11 is provided having a reduced overall size or footprint which provides increased flexibility in its placement within a patrol vehicle, and reduced visibility from outside of the patrol vehicle. The transceiver assembly 11 includes a cover 15 for receiving therein component parts of the assembly. In other words, the cover 15 is positioned over at least some of the component parts of the transceiver assembly 11 which are enclosed by a cap 18 removably attached to the rear end of the cover. The cover 15 is designed to allow a radar wave to pass there through substantially unaffected and is preferably made of a material having a low visibility color. In order to reduce the overall size or footprint of the transceiver assembly 11, the antenna horn 25 and portions of the turnstile 28 and oscillator 29 are formed from a unitary material and the circuitry 17 associated with the transceiver assembly is modularized. In addition, the circuitry 17 of the transceiver assembly 11 may be modularized in order to allow testing apart from the microwave components of the transceiver assembly 11. The transceiver assembly 11 is preferably coupled to a processing unit 12 capable of determining the speed of at least one target and displaying the speed for use by a law enforcement officer.

The foregoing description of a preferred and alternate embodiment of the invention has not been presented to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A transceiver assembly for use in a Doppler-based traffic radar system for determining the speed of at least one target comprising:
    an oscillator for generating a linearly polarized wave;
    circuitry for providing power to said local oscillator;
    a conical antenna horn;
    a mixer for receiving a coupled portion of the wave generated by said local oscillator and a portion of a return circularly polarized wave reflected from the at least one target;
    a turnstile in communication with said oscillator and said antenna horn for circularly polarizing the linearly polarized wave and directing a circularly polarized wave toward said antenna horn, and for linearly polarizing the circularly polarized return wave and directing the linearly polarized wave to said mixer;
    a lens supported by said antenna horn for forming said circularly polarized wave into a beam; and
    a cover for receiving therein at least said antenna horn and said lens.

2. The transceiver assembly of claim 1 further comprising a cap for enclosing at least said antenna horn and said lens within said cover.

3. The transceiver assembly of claim 2, wherein at least a portion of said cover is substantially transparent to said circularly polarized wave.

4. The transceiver assembly of claim 3, wherein said cover is a low visibility color.

5. The transceiver assembly of claim 1, wherein said cover receives said oscillator, said circuitry, said antenna horn, said lens, said turnstile, and said mixer; and
    a cap for enclosing said oscillator, said circuitry, said antenna horn, said lens, said turnstile, and said mixer within said cover.

6. The transceiver assembly of claim 5, wherein at least a portion of said cover is substantially transparent to said circularly polarized wave.

7. The transceiver assembly of claim 6, wherein said cover is a low visibility color.

8. A transceiver assembly for use in a Doppler-based traffic radar system for determining the speed of at least one target comprising:
    an oscillator for generating a linearly polarized wave;
    circuitry for providing power to said local oscillator;
    a conical antenna horn having a taper angle of no more than substantially sixty degrees and a length of no more than substantially one and three-quarters inches;
    a mixer for receiving a coupled portion of the wave generated by said local oscillator and a portion of a return circularly polarized wave reflected from the at least one target;
    a turnstile in communication with said oscillator and said antenna horn for circularly polarizing the linearly polarized wave and directing a circularly polarized wave toward said antenna horn, and for linearly polarizing the circularly polarized return wave and directing the linearly polarized wave to said mixer; and
    a lens supported by said antenna horn for forming said circularly polarized wave into a beam.

9. The transceiver assembly of claim 8, wherein a length of said conical antenna horn and said turnstile is less than one and three-quarters inches.

10. The transceiver assembly of claim 8, wherein a length of said conical antenna horn, said turnstile, and said mixer is less than one and three-quarters inches.

11. A transceiver assembly for use in a Doppler-based traffic radar system for determining the speed of at least one target comprising:

an oscillator for generating a linearly polarized wave;

circuitry for providing power to said local oscillator;

a conical antenna horn;

a mixer for receiving a coupled portion of the wave generated by said local oscillator and a portion of a return wave reflected from the at least one target;

a turnstile comprising waveguide cavities, a waveguide cavity top plate, and a post extending from said waveguide cavity top plate in communication with said oscillator and said antenna horn for circularly polarizing the linearly polarized wave and directing a circularly polarized wave toward said antenna horn, and for linearly polarizing the circularly polarized return wave and directing the linearly polarized wave to said mixer;

a lens supported by said antenna horn for forming said circularly polarized wave into a beam; and wherein said conical antenna horn and said turnstile waveguide cavities are formed from a unitary material.

12. The transceiver assembly of claim 10, wherein said local oscillator comprises a choke, a Gunn diode, a quartz tuner, and a resonator; and wherein said resonator is formed from said unitary material.

13. The transceiver assembly of claim 10, wherein said turnstile waveguide cavities include a coupler waveguide cavity wherein a portion of the linearly polarized wave generated by said oscillator is coupled for use in said mixer.

14. A transceiver assembly for use in a Doppler-based traffic radar system for determining the speed of at least one target comprising:

an oscillator for generating a linearly polarized wave;

circuitry mounted on at least one board, said at least one board being removably mounted to said transceiver assembly for testing;

a conical antenna horn;

a mixer for receiving a coupled portion of the wave generated by said local oscillator and a portion of a return wave reflected from the at least one target;

a turnstile in communication with said oscillator for circularly polarizing the linearly polarized wave and directing a circularly polarized wave toward said antenna horn, and for linearly polarizing the circularly polarized return wave and directing the linearly polarized wave to said mixer; and a lens supported by said antenna horn for forming said circularly polarized wave into a beam.

15. The transceiver assembly of claim 14, wherein said circuitry comprises at least one power supply for providing power to at least said oscillator, and a pre-amplifier for amplifying a mixer output signal.

16. The transceiver assembly of claim 15, wherein a first power supply for providing power to said oscillator is mounted on a first board, and a pre-amplifier for amplifying the mixer output signal is mounted on a second board.

17. A transceiver assembly for use in a Doppler-based traffic radar system for determining the speed of at least one target comprising:

an oscillator for generating a linearly polarized wave;

circuitry for providing power to said local oscillator a conical antenna horn;

a mixer for receiving a coupled portion of the wave generated by said local oscillator and a portion of a return wave reflected from the at least one target;

a turnstile in communication with said oscillator and said antenna horn for circularly polarizing the linearly polarized wave and directing a circularly polarized wave toward said antenna horn, and for linearly polarizing the circularly polarized return wave and directing the linearly polarized wave to said mixer;

a lens supported by said antenna horn for forming said circularly polarized wave into a beam;

an enclosure having an open end and a closed end through which the beam is transmitted comprising a cover for receiving therein at least said antenna horn and said lens, and a cap for sealing said open end; and a connector mounted to said cap.

18. The transceiver assembly of claim 17, wherein at least a portion of said enclosure is substantially transparent to said circularly polarized wave.

19. A Doppler-based radar system for determining the speed of at least one target comprising:

at least one transceiver assembly comprising an oscillator for generating a linearly polarized wave, circuitry for providing power to said local oscillator, a conical antenna horn, a mixer for receiving a coupled portion of the wave generated by said local oscillator and a portion of a return wave reflected from the at least one target and outputting a signal representative of a difference in frequency between the generated wave and the reflected wave for the at least one target, a turnstile in communication with said oscillator and said antenna horn for circularly polarizing the linearly polarized wave and directing a circularly polarized wave toward said antenna horn and for linearly polarizing the circularly polarized return wave and directing the linearly polarized wave to said mixer, a lens supported by said antenna horn for forming said circularly polarized wave into a beam, and a cover for positioning over at least said antenna horn and said lens; and a processing unit coupled to said transceiver assembly for receiving the signal from said transceiver assembly, said processing unit programmed to determine a speed of the at least one target.

20. The Doppler-based radar system of claim 19, wherein said cover includes an open end and a closed end through which the beam is transmitted, and said transceiver assembly further comprises a cap for enclosing at least said antenna horn and said lens within said cover.

21. The Doppler-based radar system of claim 19, further comprising a display for displaying the speed of the at least one target.

* * * * *